(12) United States Patent
Abramson et al.

(10) Patent No.: US 7,920,685 B2
(45) Date of Patent: Apr. 5, 2011

(54) PRIVATE BRANCH EXCHANGE WITH SELF-REFERENCING EXTENSIONS

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1106 days.

(21) Appl. No.: 11/563,674

(22) Filed: Nov. 27, 2006

(65) Prior Publication Data
US 2008/0123837 A1    May 29, 2008

(51) Int. Cl.
*H04M 3/42*    (2006.01)
*H04M 1/57*    (2006.01)

(52) U.S. Cl. ............ 379/201.01; 379/207.15; 455/414.1

(58) Field of Classification Search ............ 379/201.01, 379/202.01, 207.01, 211.02, 212.01, 207.14, 379/207.15, 231–234; 455/414.1, 416, 417, 455/554.1, 555
See application file for complete search history.

(56) References Cited

U.S. PATENT DOCUMENTS

| | | | |
|---|---|---|---|
| 5,339,356 A * | 8/1994 | Ishii | 379/234 |
| 5,818,921 A | 10/1998 | Vander Meiden et al. | |
| 5,875,234 A | 2/1999 | Clayton et al. | |
| 5,949,873 A * | 9/1999 | Pinard | 379/234 |
| 6,611,589 B1 | 8/2003 | Yang | |
| 6,798,874 B1 | 9/2004 | Ohlinger et al. | |
| 6,950,507 B1 | 9/2005 | Kaplan | |
| 6,993,360 B2 * | 1/2006 | Plahte et al. | 455/555 |
| 7,082,119 B1 | 7/2006 | Tamsil | |
| 2006/0159246 A1 | 7/2006 | Abramson et al. | |

FOREIGN PATENT DOCUMENTS

| | | |
|---|---|---|
| DE | 19706780 A1 | 8/1998 |
| GB | 2422510 A | 7/2006 |
| JP | 2001-61014 A | 3/2001 |

OTHER PUBLICATIONS

Dr. Andrew Courtenay, "GB Application No. GB0723260.6 Office Action", Feb. 29, 2008, Published in: GB.

* cited by examiner

*Primary Examiner* — Harry S Hong
(74) *Attorney, Agent, or Firm* — DeMont & Breyer, LLC (57) ABSTRACT

A telecommunications system is disclosed that enables a user to pair a desk set that is an extension of a private-branch exchange with a cell phone that is accessible via the Public Switched Telephone Network. One feature of the telecommunications system enables a call that is directed to the user's desk set to be automatically forwarded to the user's cell phone. This is advantageous to the user because it provides the illusion to the caller that the user is physically in his or her office when they are not necessarily there. A similar feature also provides the illusion when a third party initiates a call that connects the user's cell phone to a called party. Such a third party includes a computer telephony application in a telephone telemarketing center, which automatically places many outgoing telephone calls.

21 Claims, 11 Drawing Sheets

PRIVATE BRANCH EXCHANGE WITH SELF-REFERENCING EXTENSIONS

FIELD OF THE INVENTION

The present invention relates to telecommunications in general, and, more particularly, to computer-telephony integration.

BACKGROUND OF THE INVENTION

A business that desires to provide employees at one location with telephones has, in general, two options. First, the business can acquire one telephone and one telephone line per employee from the telephone company. Second, the business can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." Private-branch exchanges are also capable of providing valuable telecommunications features to their users.

SUMMARY OF THE INVENTION

The present invention enables a valuable capability of a telecommunications system. In the prior art, one feature of a telecommunications system enables a user to pair a desk set that is an extension of a private-branch exchange with a cell phone that is accessible via the Public Switched Telephone Network. The feature enables a call that is directed to the user's desk set to be automatically forwarded to the user's cell phone. This is advantageous to the user because it provides the illusion to the caller that the user is physically in his or her office when they are not necessarily there.

A similar feature enables the user to place a call from the cell phone to called party and have the telephone number of the desk set be the caller-ID for the call rather than the telephone number of the cell phone. This is advantageous to the user because it provides the illusion to the called party that the user is physically in his or her office when they are not necessarily there.

The illustrative embodiment of the present invention also provides the illusion when a third party initiates a call that connects the user's cell phone to a called party. Such a third party includes a computer telephony application in a telephone telemarketing center, which automatically places many outgoing telephone calls. In the prior art, when a third party initiated a call that connected the user's cell phone to a called party, the called party said the user's cell phone number as the caller-ID. This would give the called party the telephone number of the user's cell phone, which is personal information that the user would prefer to keep private.

The illustrative embodiment comprises establishing a resultant call between a telephone number T and a telephone number C while transmitting a telephone number D as the calling-party number to said telephone number T; wherein said telephone number C is determined from a combination of said telephone number D and a telephone number F; wherein said telephone number D is within the address space of a private-branch exchange; wherein said telephone number F is within the address space of said private-branch exchange.

DETAILED DESCRIPTION

Figure 1:
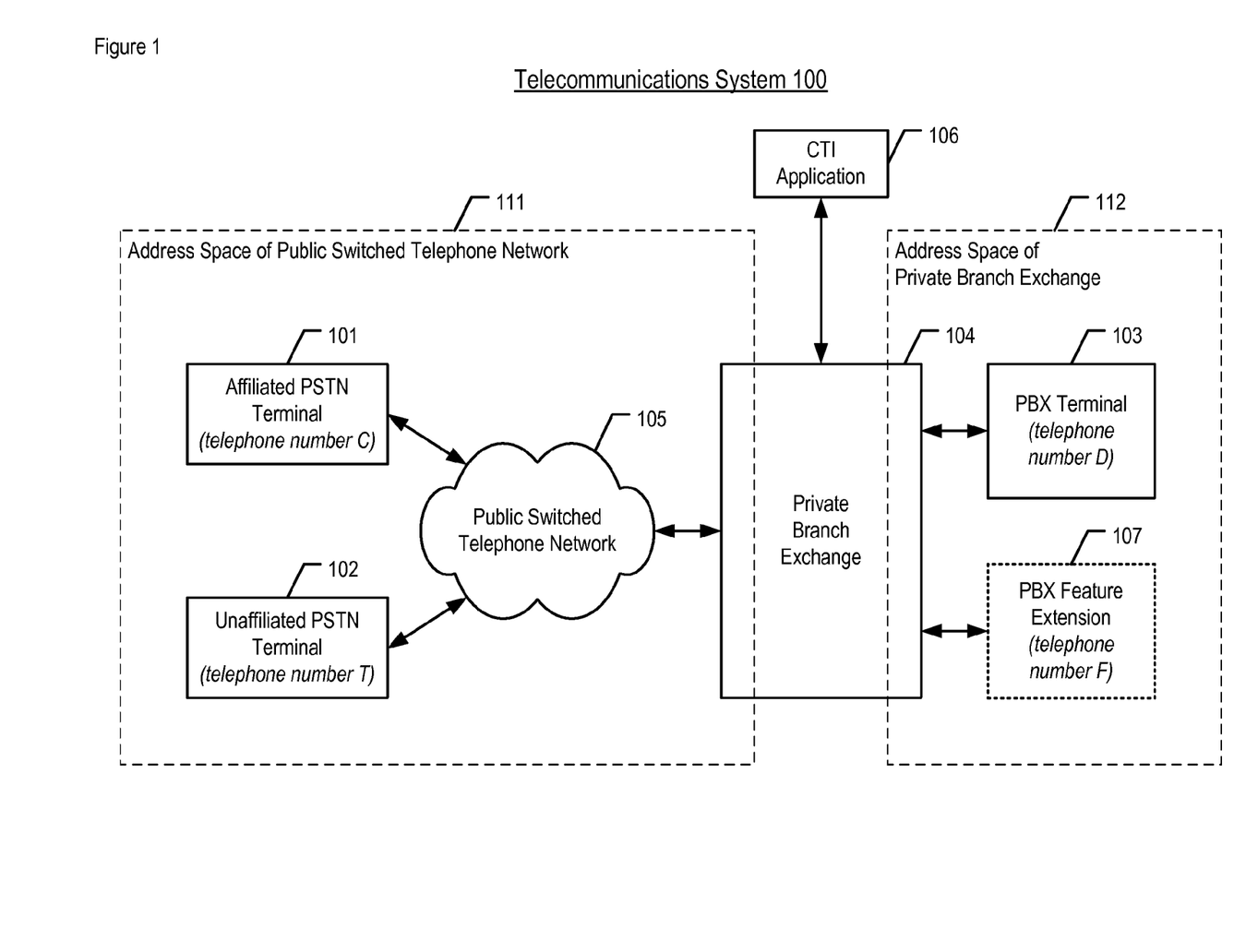
FIG. 1 depicts a schematic diagram of the salient components of telecommunications system 100 in accordance with the illustrative embodiment of the present invention.

Telecommunications System 100—FIG. 1 depicts a schematic diagram of the salient components of telecommunications system 100 in accordance with the illustrative embodiment of the present invention. Telecommunications system 100 comprises affiliated PSTN terminal 101; unaffiliated PSTN terminal 102; private-branch exchange (PBX) terminal 103; private-branch exchange (PBX) telephone system 104; Public Switched Telephone Network 105; computer-telephony integration (CTI) application 106; and PBX feature extension 107 interconnected as shown.

Although the illustrative embodiment comprises one affiliated PSTN telecommunications terminal, one unaffiliated PSTN telecommunications terminal, one PBX feature extension, and one PBX telecommunications terminal, it will be clear to those skilled in the art, after reading this disclosure, how to make and use alternative embodiments of the present invention that comprise any number of affiliated PSTN telecommunications terminals, unaffiliated PSTN telecommunications terminals, PBX feature extensions and PBX telecommunications terminals.

Affiliated PSTN terminal 101 is an telecommunications terminal that corresponds to telephone number C in address space 111 of Public Switched Telephone Network 105. It will be clear to those skilled in the art, after reading this specification, how to make and use alternative embodiments of the present invention in which affiliated PSTN terminal 101 corresponds to a telephone number in the address space of a private branch exchange, such as, for example and without limitation, address space 112 of private branch exchange 104. In accordance with the illustrative embodiment, affiliated PSTN terminal 101 is a wireless terminal (e.g., cellular telephone, etc.). It will be clear to those skilled in the art, after reading this disclosure, how to make and use alternative embodiments of the present invention in which affiliated PSTN terminal 101 is a wireline terminal. It will be clear to those skilled in the art how make and use affiliated PSTN terminal 101.

Unaffiliated PSTN terminal 102 is an telecommunications terminal that corresponds to telephone number T in address space 111 of Public Switched Telephone Network 105. It will be clear to those skilled in the art, after reading this disclosure, how to make and use alternative embodiments of the present invention in which unaffiliated PSTN terminal 102 corresponds to a telephone number in the address space of a private branch exchange, such as, for example and without limitation, address space 112 of private branch exchange 104. In accordance with the illustrative embodiment, unaffiliated PSTN terminal 102 is a wireless terminal (e.g., cellular telephone, etc.). It will be clear to those skilled in the art, after reading this disclosure, how to make and use alternative embodiments of the present invention in which unaffiliated PSTN terminal 102 is a wireline terminal. It will be clear to those skilled in the art how to make and use unaffiliated PSTN terminal 102.

PBX terminal 103 is a telecommunications terminal that corresponds to telephone number D in address space 112 of private branch exchange 104. It will be clear to those skilled in the art, after reading this disclosure, how to make and use alternative embodiments of the present invention in which PBX terminal 103 corresponds to a telephone number in address space 111 of the Public Switched Telephone Network or the address space of another private branch exchange. In accordance with the illustrative embodiment, terminal 103 is a wireline terminal. It will be clear to those skilled in the art, after reading this disclosure, how to make and use alternative embodiments of the present invention in which terminal 103 is a wireless terminal. It will be clear to those skilled in the art how to make and use terminal 103.

Private-branch exchange 104 is a switch that provides telecommunications service to PBX terminal 103. Private branch exchange 104 comprises a data structure that associates the telephone number that corresponds to the PBX terminal 103 with the telephone number that corresponds to affiliated terminal 101. An example of such a data structure is depicted in Table 1.

TABLE 1

Data Structure That Associates the Telephone Number That
Corresponds to PBX Terminal 103 with the Telephone Number
That Corresponds to Affiliated Terminal 101

| Telephone Number That Corresponds to PBX Terminal 103 | Telephone Number That Corresponds to Affiliated Terminal 101 |
|---|---|
| D | C |

Although the illustrative embodiment associates one pair of telephone numbers, it will be clear to those skilled in the art, after reading this disclosure, how to make and use alternative embodiments of the present invention that associate any number of pairs.

Furthermore, private-branch exchange 104 comprises feature extension 107 that corresponds to telephone number F in address space 112 of private-branch exchange 104. In accordance with the illustrative embodiment, feature extension 107 is not a telecommunications terminal for a user. In contrast, feature extension 107 is a trigger that initiates an task by private-branch exchange 104. In particular, a call to feature extension 107 causes private-branch exchange 104 to extend the call to the telephone number that is associated with the telephone number from which the call originates. In other words, when private-branch exchange 104 receives a call that is placed to feature extension F from telephone number D, PBX 104 uses the telephone number of the calling party—in this case D—and the data structure of Table 1 to determine the telephone number to which the call is extended—in this case telephone number C.

It will be clear to those skilled in the art, after reading this disclosure, how to make and use alternative embodiments of the present invention in which feature extension 107 corresponds to a telecommunications terminal for a user.

In accordance with the illustrative embodiment, the operation of private-branch exchange 104 and PBX terminal 103 can be directed by computer-telephony integration application 106 in well-known fashion. The details of how to make and use private-branch exchange 104 are described in detail below and in the following drawings.

Public Switched Telephone Network 105 is the public telephone network. It will be clear to those skilled in the art how to make and use Public Switched Telephone Network 105.

Computer telephony integration (CTI) application 106 is a combination of hardware and software that directs the operation of private-branch exchange 104 and PBX terminal 103. In particular the CTI application provides the functionality described in detail below and in the accompanying figures. It will be clear to those skilled in the art, after reading this disclosure, how to make and use alternative embodiments of the present invention in which CTI application 106 is absent and its functionality is performed by private-branch exchange 104 or by a natural person or by a combination of private-branch exchange 104 and by a natural person.

In accordance with the illustrative embodiment, CTI application 106 runs on an independent general-purpose processor. It will be clear to those skilled in the art, after reading this disclosure, how to make and use alternative embodiments of the present invention in which CTI application 106 runs on an adjunct processor of private-branch exchange 104, a component of one or more of the terminals of telecommunication system 100, or on a special-purpose processor. The details of how to make and use CTI application 106 are described in detail below and in the following drawings.

Figure 2:
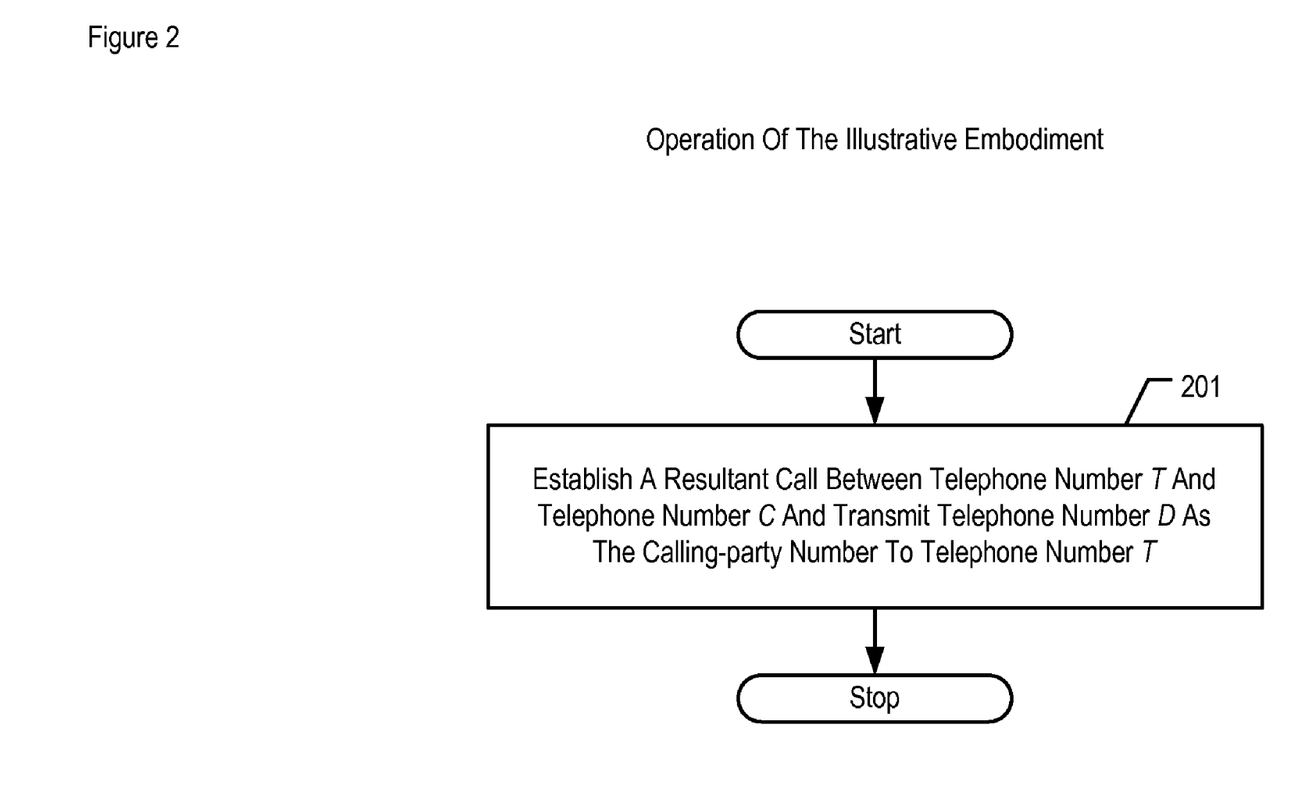
FIG. 2 depicts a flowchart of the salient task performed by the illustrative embodiment of the present invention.

Operation of the Illustrative Embodiment—FIG. 2 depicts a flowchart of the salient task performed by the illustrative embodiment of the present invention.

Task 201 comprises establishing a resultant call between telephone number T and telephone number C while transmitting telephone number D as the calling party number to telephone number T. The details of how to perform task 201 are described in detail below and in the following drawings.

Figure 3:
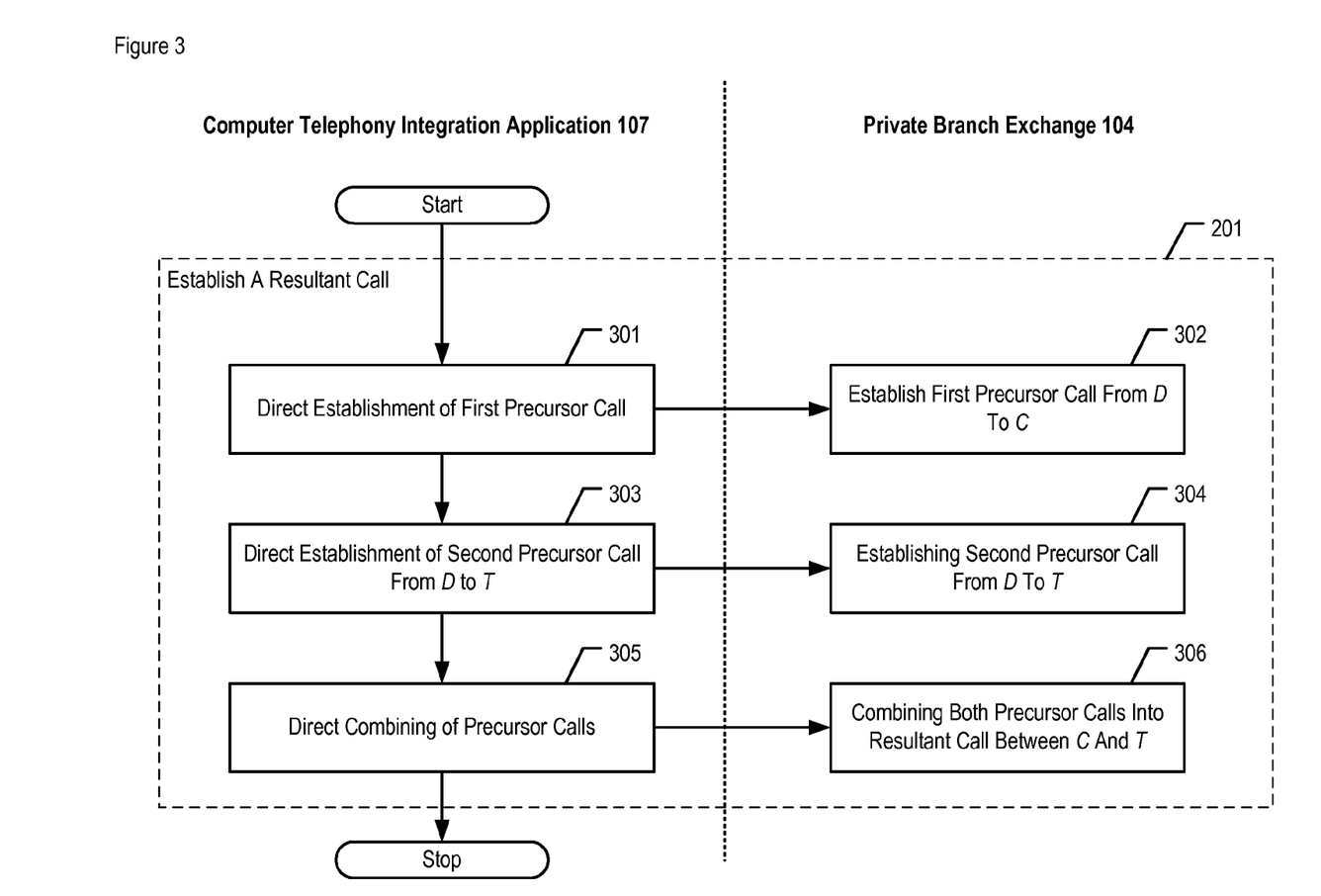
FIG. 3 depicts a flowchart of the salient tasks of task 201 in accordance with the illustrative embodiment of the present invention.

Establish Resultant Call—FIG. 3 depicts a flowchart of the salient tasks of task 201 in accordance with the illustrative embodiment of the present invention.

At task 301, CTI application 106 directs private-branch exchange 104 to establish a first precursor call from telephone number D to the telephone number that is associated with telephone number D (i.e., telephone number C). The details of task 301 are described in detail below and in the accompanying figures.

Figure 4A:
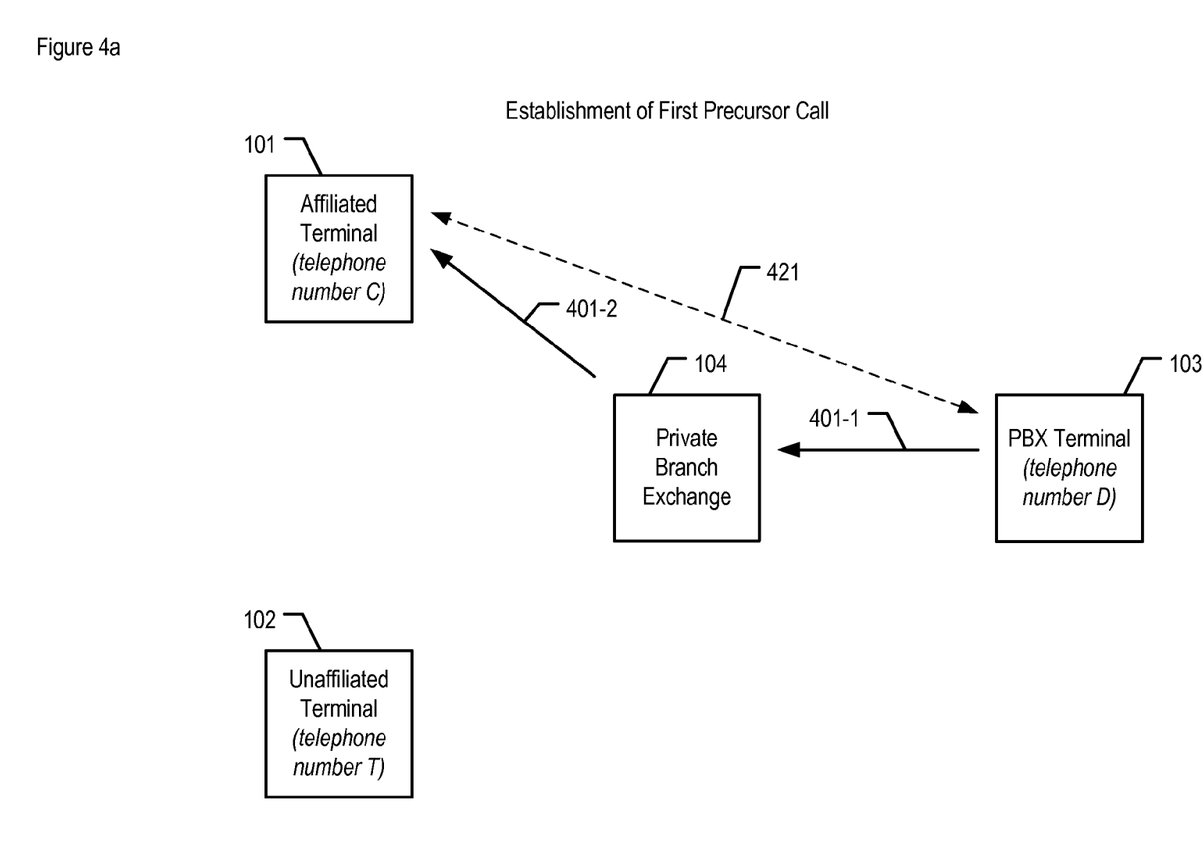
FIGS. 4a, 4b, 4c, and 4d depict graphs of the salient components of the precursor calls and resultant calls.

In response to task 301, private-branch exchange 104 establishes at task 302 the first precursor call from telephone number D to telephone number C. FIG. 4a depicts a graph of the salient components of first precursor call 421, which comprises connection 401-1 and connection 401-2. The details of task 302 are described in detail below and in the accompanying figures.

At task 303, CTI application 106 directs private-branch exchange 104 to establish a second precursor call from telephone number D to telephone number T. In accordance with the illustrative embodiment, task 303 is distinct from task 301. It will be clear to those skilled in the art, however, after reading this disclosure, how to make and use alternative embodiments of the present invention in which tasks 301 and 303 are combined or concurrent or performed in the opposite order. It will be clear to those skilled in the art how to make and use embodiments of the present invention that accomplish task 303.

Figure 4B:
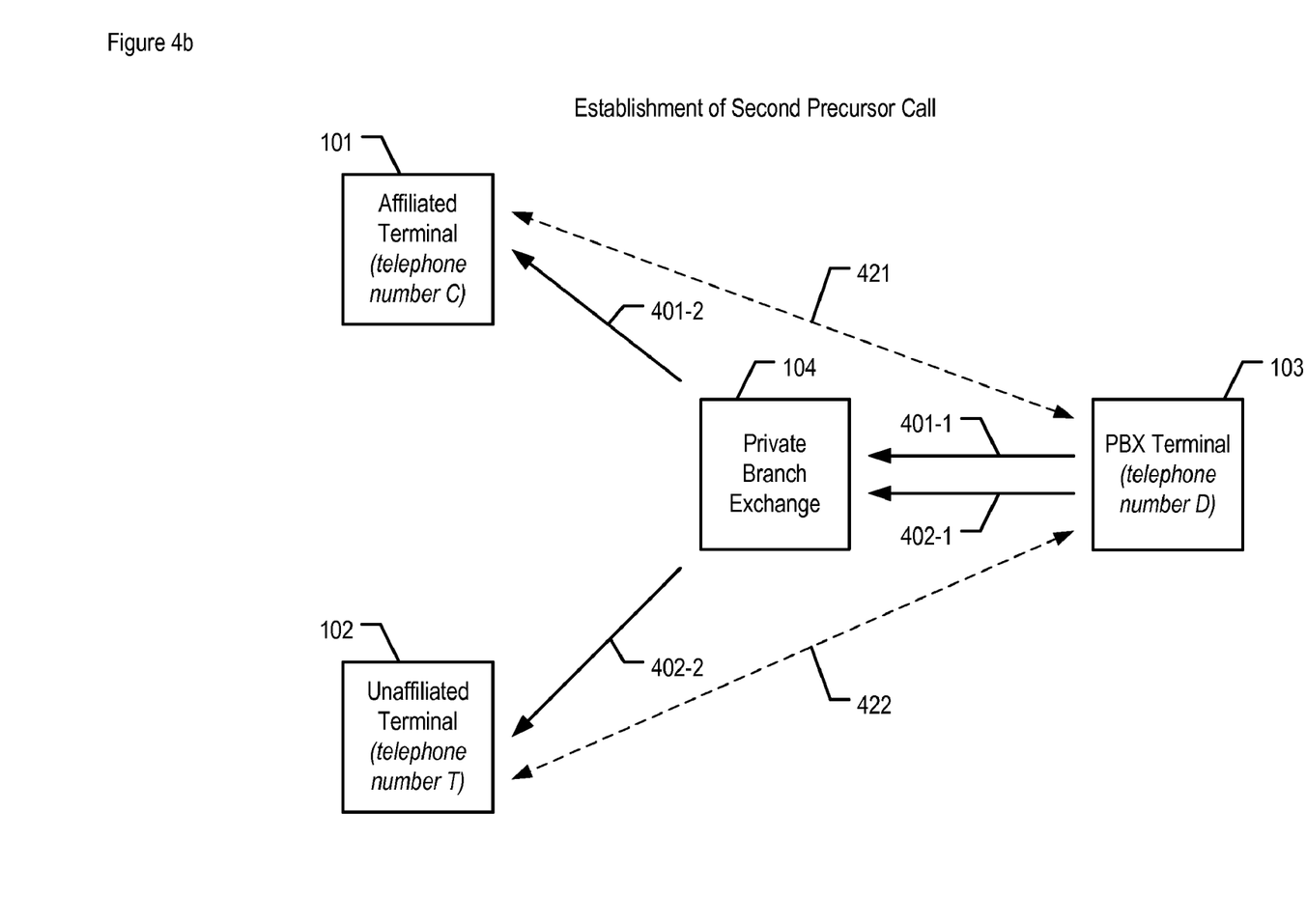

In response to task 303, private-branch exchange 104 establishes at task 304, the second precursor call from telephone number D to telephone number T. FIG. 4b depicts a graph of the salient components of first precursor call 421 and second precursor call 422, which comprises connection 402-1 and connection 402-2. In accordance with the illustrative embodiment, task 302 is performed before task 304. It will be clear to those skilled in the art, after reading this specification, how to make and use alternative embodiments of the present invention in which task 302 and task 304 are performed concurrently or in the opposite order. It will be clear to those skilled in the art how to make and use embodiments of the present invention that accomplish task 304.

At task 305, CTI application 106 directs private-branch exchange 104 to combine the first precursor call and the second precursor call to generate a resultant call between telephone number C and telephone number T while transmitting telephone number D as the calling party number to telephone number T. In accordance with the illustrative embodiment, task 305 is distinct from task 301 and task 303. It will be clear to those skilled in the art, after reading this disclosure, how to make and use alternative embodiments of the present invention in which task 301, task 303, and task 305 are combined or concurrent or performed in any order. It will be clear to those skilled in the art how to make and use embodiments of the present invention that accomplish task 305.

Figure 4C:
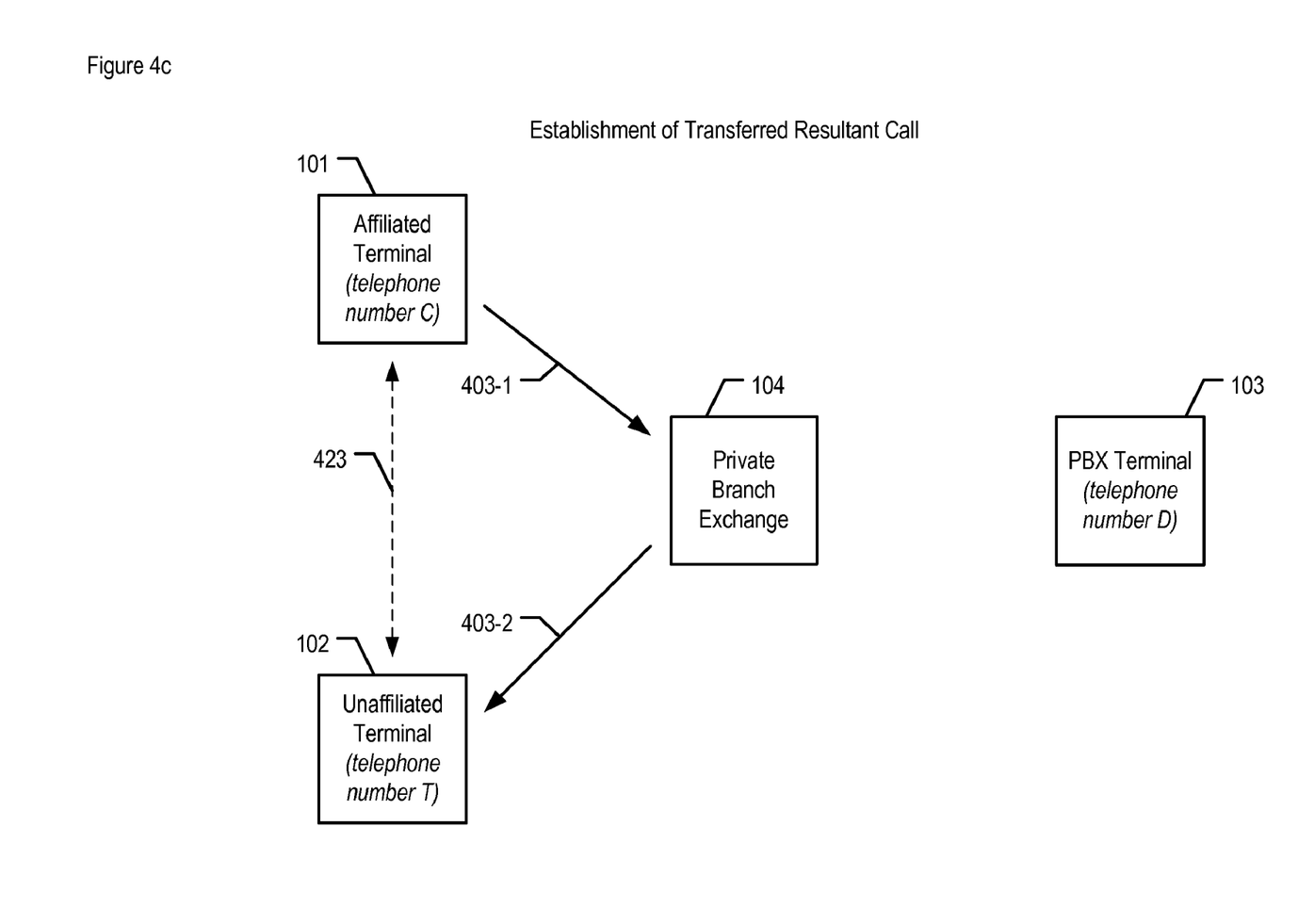
Figure 4D:
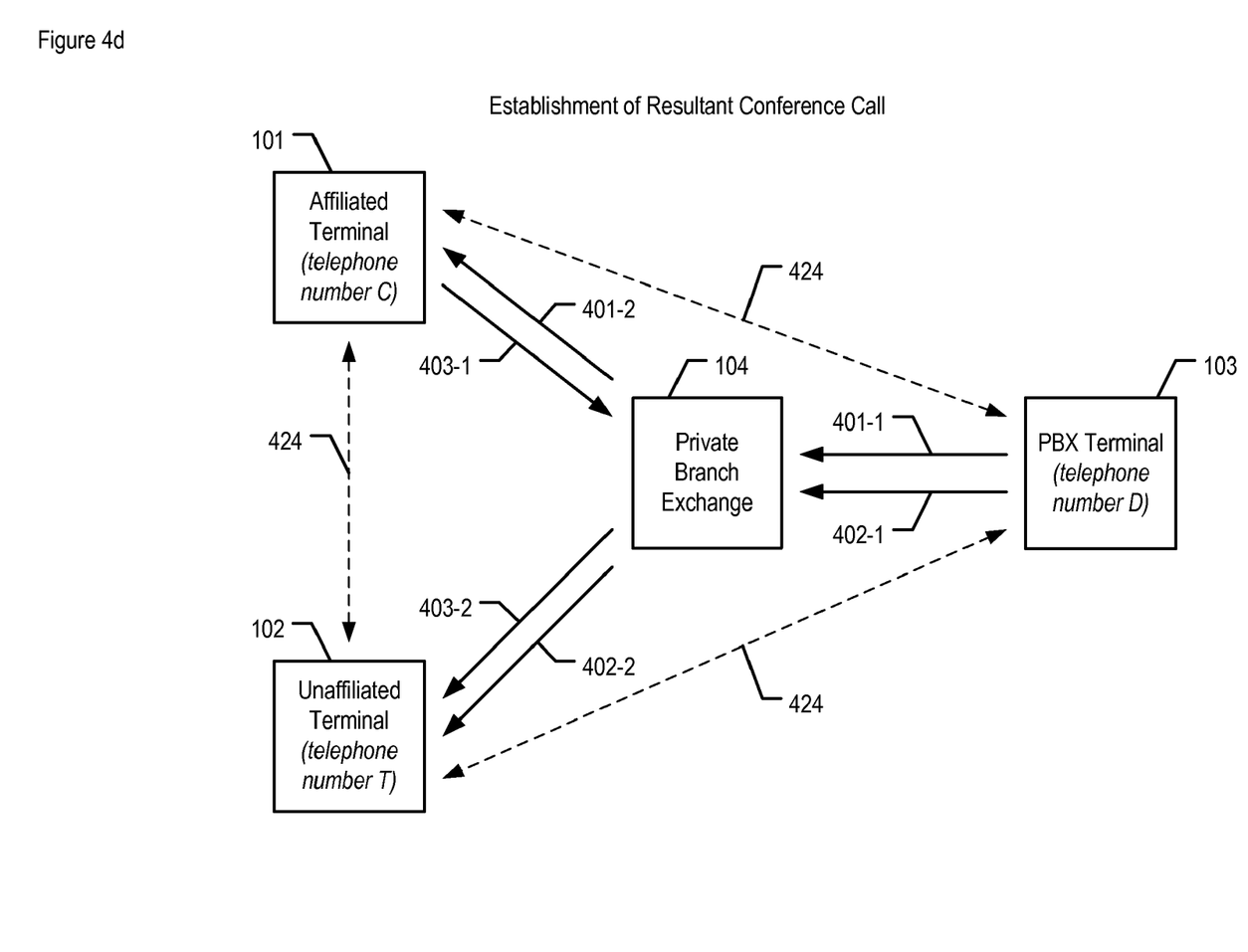

In response to task 305, private-branch exchange 104 combines, at task 306, the first precursor call and the second precursor call to generate the resultant call between telephone number C and telephone number T while transmitting telephone number D as the calling party number to telephone number T. In accordance with the illustrative embodiment, the combination of the first precursor call and the second precursor call results in two-party resultant call 423 comprising connection 403-1 and connection 403-2, as depicted in FIG. 4c. It will be clear to those skilled in the art, after reading this specification, how to make and use alternative embodiments of the present invention in which the combination of the first precursor call and the second precursor call results in conference call 424, as depicted in FIG. 4d. Task 306 is described in detail below and in the accompanying figures.

Figure 5:
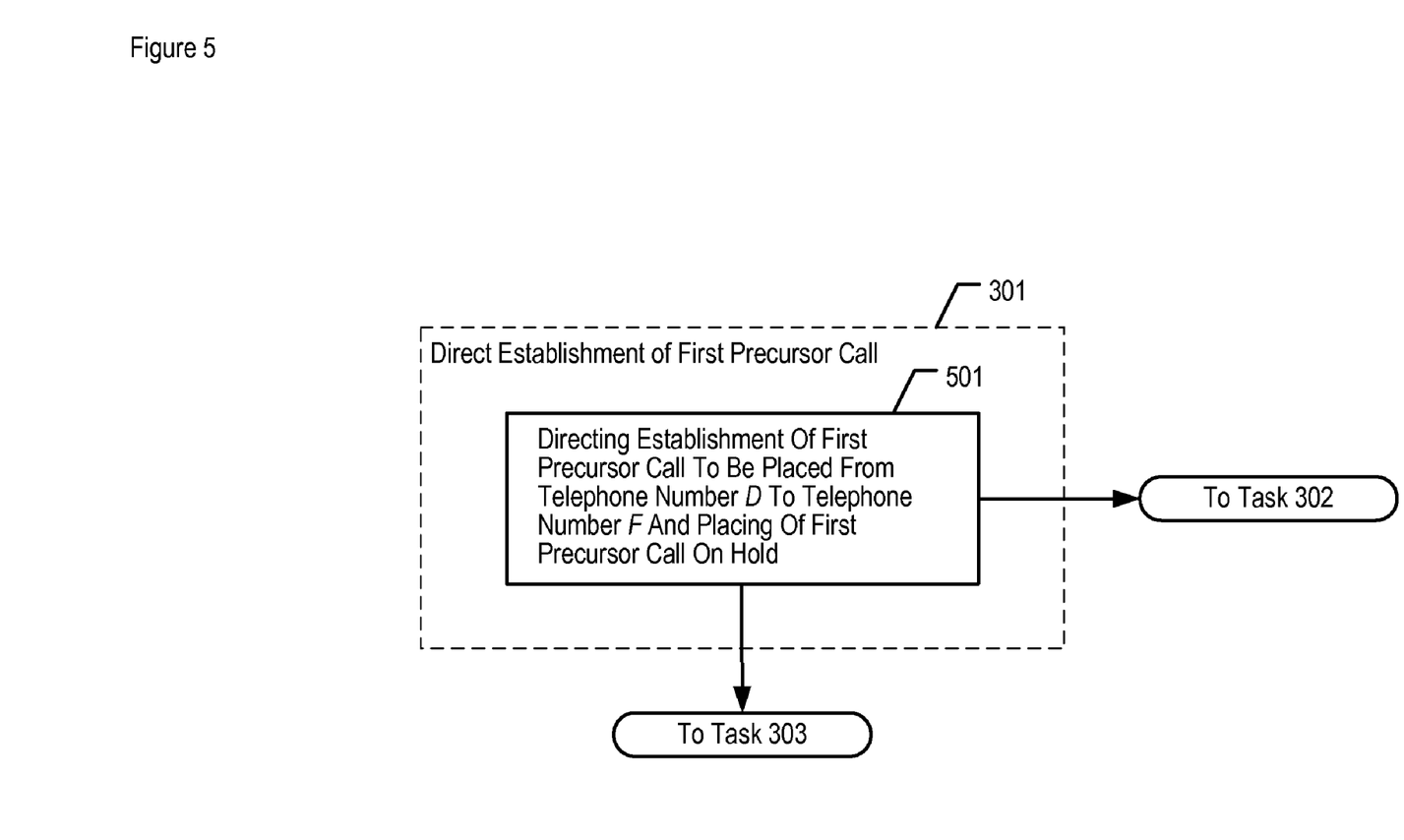
FIG. 5 depicts a flowchart of the salient task performed by the illustrative embodiment in accomplishing task 301.

Direct Establishment of First Precursor Call—FIG. 5 depicts a flowchart of the salient tasks performed by the illustrative embodiment in accomplishing task 301.

At task 501, CTI application 106 directs private-branch exchange 104 to establish the first precursor call from telephone number D to telephone number F and to place the first precursor call on hold. It will be clear to those skilled in the art, after reading this disclosure, how to make and use alternative embodiments of the present invention in which CTI application 106 directs terminal 103, via private-branch exchange 104, to establish the first precursor call. It will be clear to those skilled in the art how to make and use embodiments of the present invention that accomplish task 301.

Figure 6:
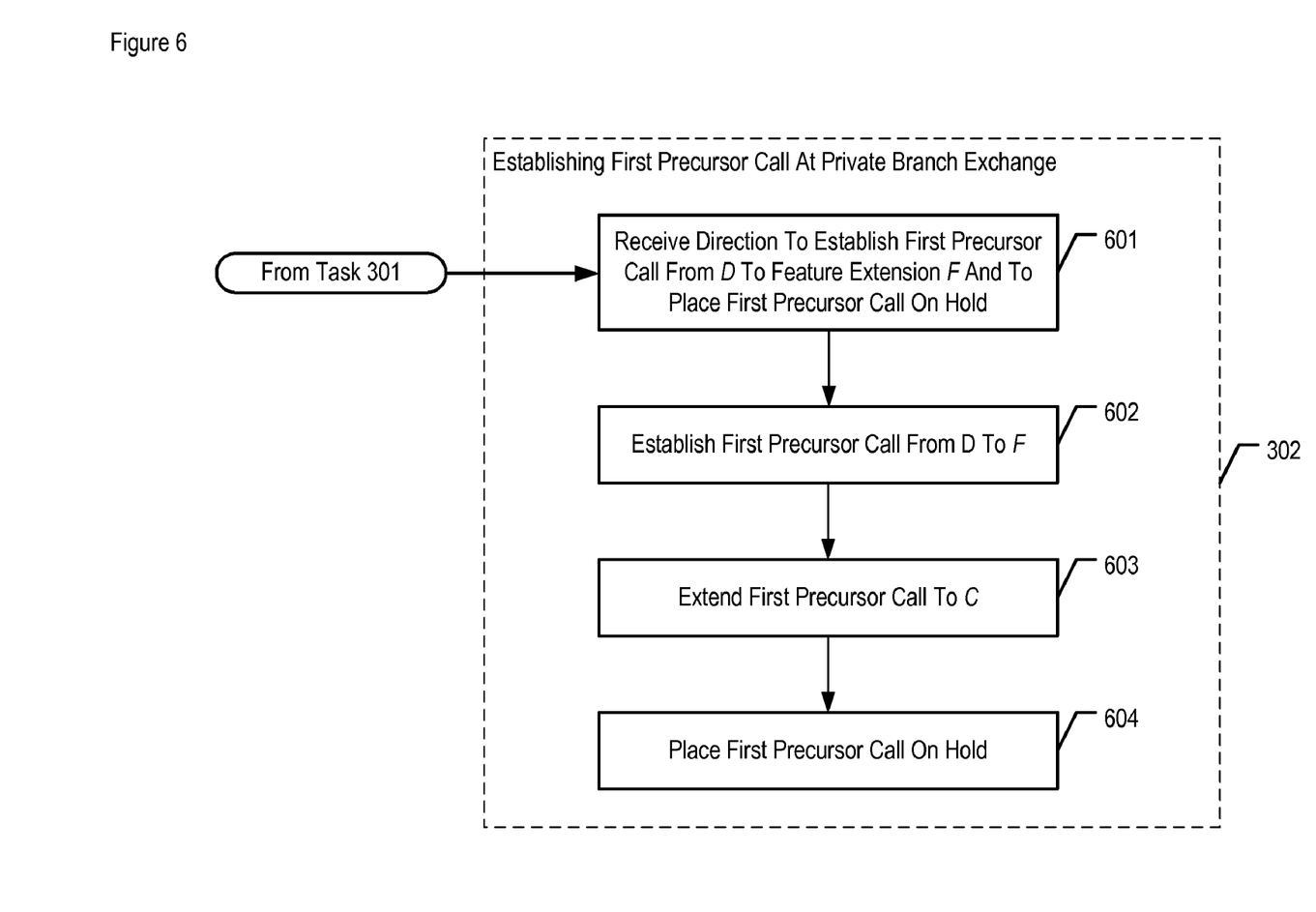
FIG. 6 depicts a flowchart of the salient tasks performed by the illustrative embodiment in accomplishing task 302.

Establish First Precursor Call—FIG. 6 depicts a flowchart of the salient tasks performed by the illustrative embodiment in accomplishing task 302.

At task 601, private-branch exchange 104 is directed by CTI application 106 to establish a first precursor call from telephone number D to telephone number F and to place the first precursor call on hold. In accordance with the illustrative embodiment, CTI application 106 directs private-branch exchange 104 to establish the first precursor call. It will be clear to those skilled in the art, after reading this disclosure, how to make and use alternative embodiments of the present invention in which CTI application 106 directs terminal 103, via private-branch exchange 104, to establish the first precursor call.

At task 602, private-branch exchange 104 establishes the first precursor call from telephone number D to telephone number F, in well-known fashion.

At task 603, in response to the call to telephone number F, private-branch exchange 104 extends the first precursor call to telephone number C, in well-known fashion. Specifically, calls to telephone number F, a feature extension with the functionality described above, are automatically extended to the telephone number associated with the calling-party telephone number.

At task 604, private-branch exchange 104 places the first precursor call on hold, in well-known fashion.

Figure 7:
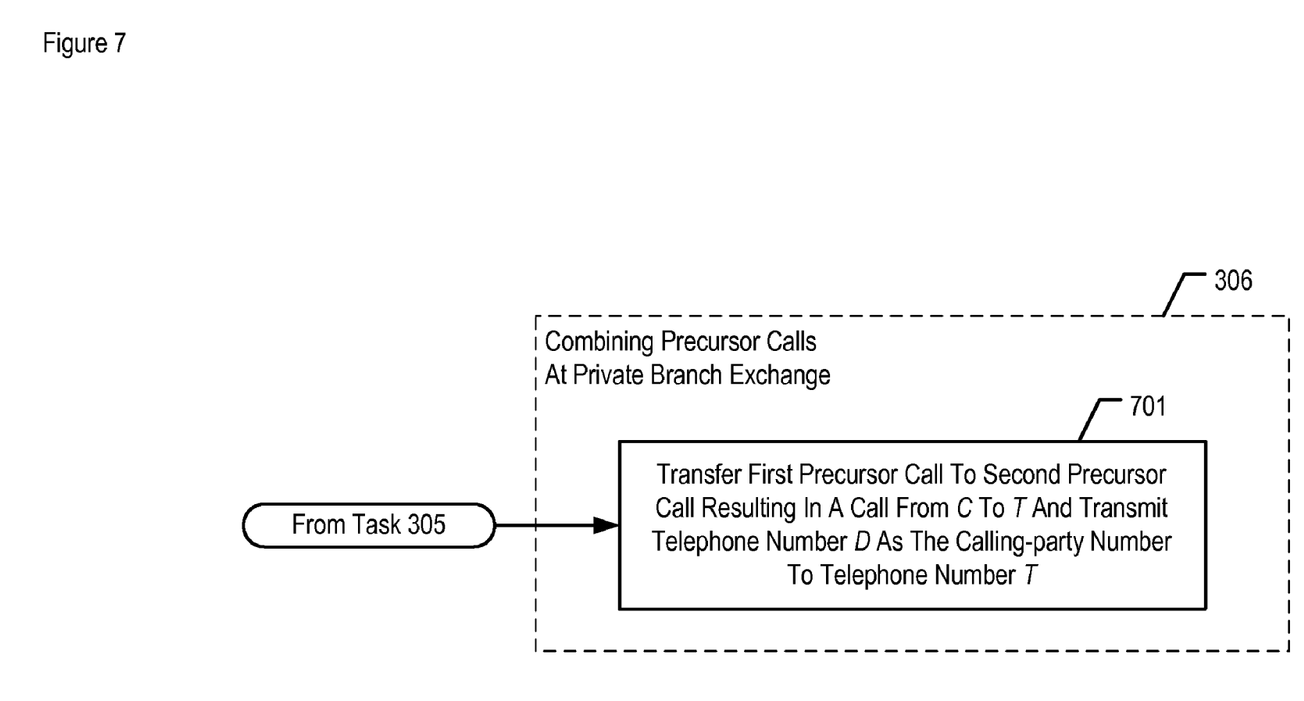
FIG. 7 depicts a flowchart of the salient task performed by the illustrative embodiment in accomplishing task 306.

Transferring the First Precursor Call to the Second Precursor Call—FIG. 7 depicts a flowchart of the salient task performed by the illustrative embodiment in accomplishing task 306.

At task 701, private-branch exchange 104 transfers the first precursor call to the second precursor call to create the resultant call, in well-known fashion. The resultant call does not comprise telephone number D but private-branch exchange 104 continues as part of the resultant call to transmit telephone number D to telephone number T as the calling party number. It will be clear to those skilled in the art how to make and use embodiments of the present invention that accomplish task 701.

Figure 8:
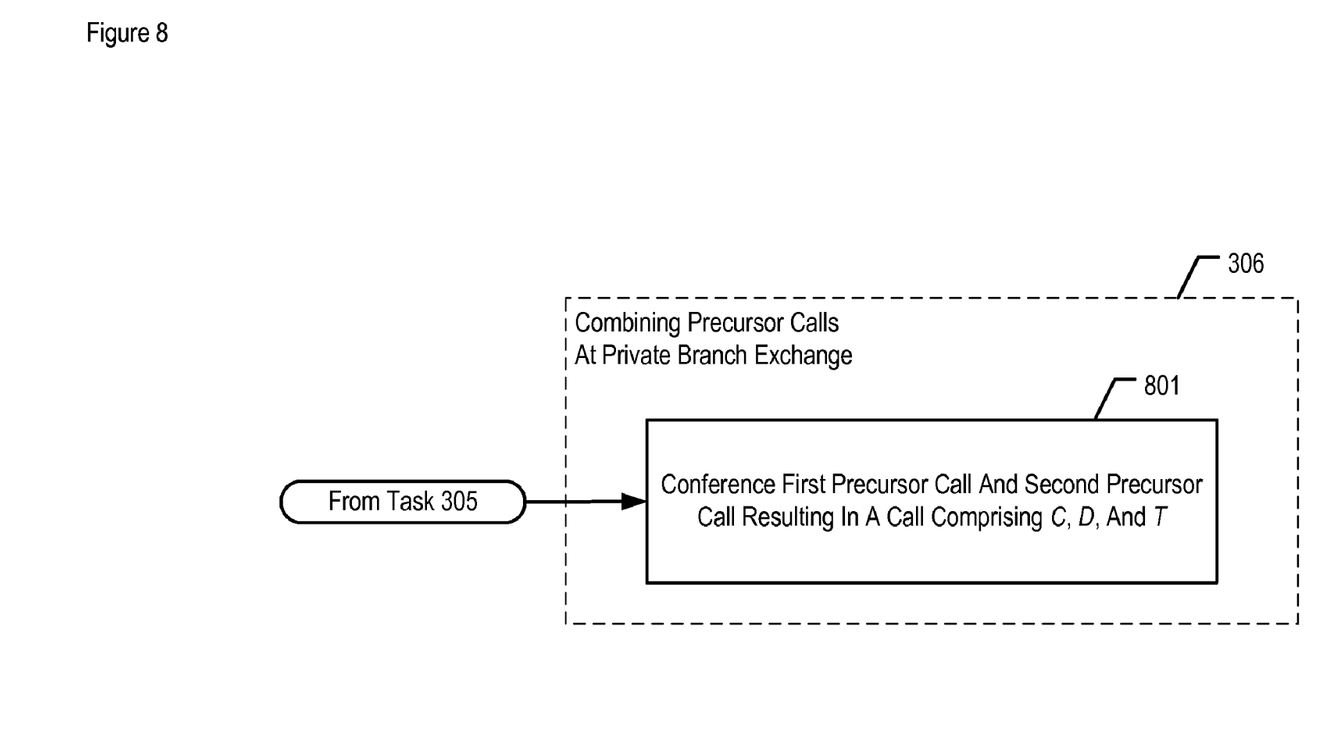
FIG. 8 depicts a flowchart of the salient task performed by the illustrative embodiment in accomplishing task 306.

Conferencing the First Precursor Call and the Second Precursor Call—FIG. 8 depicts a flowchart of the salient task performed by the illustrative embodiment in accomplishing task 306.

At task 801, private-branch exchange 104 conferences the first precursor call and the second precursor call to create the resultant call, in well-known fashion. The resultant call comprises the members of both precursor calls including telephone number D. Private-branch exchange 104 transmits only telephone number D to telephone number T as the calling party number of the resultant call. It will be clear to those skilled in the art how to make and use embodiments of the present invention that accomplish task 801.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

What is claimed is:

1. A method comprising establishing by a private-branch exchange a resultant call between a telephone number T and a telephone number C while transmitting a telephone number D as the calling-party number to said telephone number T;
   wherein said telephone number C is determined from a combination of said telephone number D and a telephone number F; and
   wherein said telephone number D is within the address space of said private-branch exchange; and
   wherein said telephone number F is within the address space of said private-branch exchange.

2. The method of claim 1 wherein the establishment of said resultant call comprises receiving at said private branch exchange a first precursor call from said telephone number D that is directed to said telephone number F.

3. The method of claim 2 wherein the establishment of said resultant call further comprises extending by said private-branch exchange said first precursor call to said telephone number C.

4. The method of claim 1 wherein the establishment of said resultant call comprises:
   (1) establishing by said private-branch exchange a first precursor call from said telephone number D to said telephone number C; and
   (2) establishing by said private-branch exchange a second precursor call from said telephone number D to said telephone number T.

5. The method of claim 4 wherein the establishment of said resultant call further comprises transferring by said private-branch exchange said first precursor call to said second precursor call to generate said resultant call.

6. The method of claim 4 wherein the establishment of said resultant call further comprises conferencing by said private-branch exchange said first precursor call and said second precursor call to generate said resultant call.

7. The method of claim 1 wherein the establishment of said resultant call comprises directing by said private-branch exchange a first precursor call to be placed from said telephone number D to said telephone number F.

8. The method of claim 7 wherein the establishment of said resultant call comprises extending by said private-branch exchange said first precursor call to said telephone number C.

9. The method of claim 1 wherein the establishment of said resultant call comprises:
   (1) directing by said private-branch exchange a first precursor call to be established from said telephone number D to said telephone number C; and
   (2) directing by said private-branch exchange a second precursor call to be established from said telephone number D to said telephone number T.

10. The method of claim 9 wherein the establishment of said resultant call further comprises directing by said private-branch exchange said first precursor call to be transferred to said second precursor call to generate said resultant call.

11. The method of claim 9 wherein the establishment of said resultant call further comprises directing by said private-branch exchange said first precursor call to be conferenced with said second precursor call to generate said resultant call.

12. The method of claim 1 wherein said telephone number C is within the address space of the Public Switched Telephone Network.

13. A method for establishing a call by a private branch exchange, said method comprising:
   receiving at said private branch exchange a first precursor call from a telephone number D that is directed to a telephone number F;
   extending by said private branch exchange said first precursor call to a telephone number C;
   receiving at said private branch exchange a second precursor call from said telephone number D that is directed to a telephone number T; and
   transferring by said private branch exchange said first precursor call to said second precursor call without transmitting said telephone number C to said telephone number T;
   wherein said telephone number C is determined from a combination of said telephone number D and said telephone number F.

14. The method of claim 13 wherein said telephone number C is within the address space of the Public Switched Telephone Network; and
   wherein said telephone number F is within the address space of said private-branch exchange.

15. The method of claim 14 wherein said telephone number D is within the address space of a private-branch exchange.

16. The method of claim 13 further comprising conferencing by said private branch exchange said first precursor call with said second precursor call without transmitting said telephone number C to said telephone number T.

17. A method comprising:
   establishing by a private branch exchange a first precursor call from a telephone number D to a telephone number C;
   establishing by said private branch exchange a second precursor call from said telephone number D to a telephone number T; and
   combining by said private branch exchange said first precursor call and said second precursor call to generate a resultant call without transmitting said telephone number C to said telephone number T.

18. The method of claim 17 wherein said telephone number C is determined from a combination of said telephone number D and a telephone number F.

19. The method of claim 18 wherein said telephone number C is within the address space of the Public Switched Telephone Network;
   wherein said telephone number F is within the address space of said private-branch exchange; and
   wherein said telephone number D is within the address space of a private-branch exchange.

20. The method of claim 17 wherein said combining comprises transferring by said private branch exchange said first precursor call to said second precursor call to generate said resultant call.

21. The method of claim 17 wherein said combining comprises conferencing by said private branch exchange said first precursor call and said second precursor call to generate said resultant call.

* * * * *